United States Patent
Dance et al.

(10) Patent No.: US 7,716,264 B2
(45) Date of Patent: May 11, 2010

(54) METHOD AND APPARATUS FOR PERFORMING ALIGNMENT SHIFTING IN A FLOATING-POINT UNIT

(75) Inventors: Sherman M. Dance, Rochester, MN (US); Jeffrey R. Summers, Raleigh, NC (US); Shivakumar Swaminathan, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1303 days.

(21) Appl. No.: 11/205,987

(22) Filed: Aug. 16, 2005

(65) Prior Publication Data

US 2007/0043795 A1 Feb. 22, 2007

(51) Int. Cl.
*G06F 15/00* (2006.01)

(52) U.S. Cl. ...................................... 708/209; 708/505

(58) Field of Classification Search ................. 708/209, 708/501, 505
See application file for complete search history.

(56) References Cited

U.S. PATENT DOCUMENTS

| | | | |
|---|---|---|---|
| 4,758,974 A | 7/1988 | Fields et al. | |
| 5,636,351 A * | 6/1997 | Lee | 712/204 |
| 5,889,690 A | 3/1999 | Arakawa | |
| 5,943,249 A | 8/1999 | Handlogten | |
| 7,099,910 B2 * | 8/2006 | Brooks et al. | 708/505 |
| 2002/0198916 A1 | 12/2002 | Kirsch | |
| 2006/0031272 A1 * | 2/2006 | Dhong et al. | 708/209 |

* cited by examiner

*Primary Examiner*—Chuong D Ngo
(74) *Attorney, Agent, or Firm*—Dillon & Yudel LLP

(57) ABSTRACT

An apparatus for performing alignment shifting in a floating-point unit is disclosed. An alignment shifter includes a shift amount calculator, a set of first level shifters and a set of second level shifter. The shift amount calculator generates one shift amount under a double-precision mode and two shift amounts under a single-precision mode. The first level shifters can concurrently receive two double-precision mantissas under the double-precision mode or two single-precision mantissas under the single-precision mode. The first level of shifts performs small shifts concurrently on the two double-precision mantissas according to the single shift amount, or on the two single-precision mantissas according to the two shift amounts. The second level shifters performs large shifts on outputs from the first level shifters to generate one double-precision floating-point result or two single-precision floating-point results.

10 Claims, 2 Drawing Sheets

METHOD AND APPARATUS FOR PERFORMING ALIGNMENT SHIFTING IN A FLOATING-POINT UNIT

BACKGROUND OF THE INVENTION

1. Technical Field

The present invention relates to floating-point units (FPUs) in general, and, in particular, to a method and apparatus for performing alignment shifting in a floating-point unit.

2. Description of Related Art

Floating-point numbers can be either single precision or double precision as defined by the Institute for Electrical and Electronic Engineers (IEEE) standard. Single precision floating-point numbers have one sign bit, eight exponent bits, and twenty-three mantissa bits with a one implicit bit. Double precision floating-point numbers have one sign bit, eleven exponent bits, and fifty-two mantissa bits with one implicit bit.

The computation logic for floating-point numbers can typically be divided into two types: multiply-add/subtract and distinct multiply and add/subtract. One of the more common methods associated with multiply-add/subtract computation logic is based on three operands A, B and C to provide the operation A*B+C. In order for a floating-point addition/subtraction to take place, the mantissas of two floating-point numbers must be aligned, which is commonly performed by an alignment shifter.

Referring now to the drawings, and specifically to FIG. 1, there is depicted a conventional alignment shifter. As shown, an alignment shifter 100 includes a shift amount calculator 111, a shifter 112, a limiter 113, and a multiplexor 114. Exponent EA of operand A, exponent EB of operand B and exponent EC of operand C enter shift amount calculator 112 and limiter 113 through a line 115, a line 116, and a line 117, respectively.

Shift amount calculations are then performed after shift amount calculator 111 has received exponents EA, EB and EC. The right-shift amount is subsequently communicated to shifter 112 via a line 118. The mantissa MC of operand C from a line 119 is right-shifted by shifter 112 accordingly. After all the shifting have been completed, the data are sent to multiplexor 114 via a line 121. Limiter 13 provides control signals to multiplexor 114 via a line 122 to allow for multiplexor 114 to provide the necessary correction for overflow or underflow.

One problem associated with conventional alignment shifters, such as alignment shifter 100, is under-utilization. Typically, a double-precision alignment shifter can handle either one single precision floating-point number or one double precision floating-point number. In a vectored floating-point implementation, such as single instruction multiple data (SIMD), it would be more efficient for the same double-precision alignment shifter to simultaneous align two single precision floating-point numbers without adding any delay to the critical path.

Consequently, it would be desirable to provide an improved method for performing alignment shifting such that all the resources of a double-precision alignment shifter can be fully utilized.

SUMMARY OF THE INVENTION

In accordance with a preferred embodiment of the present invention, an alignment shifter includes a shift amount calculator, a set of first level shifters and a set of second level shifter. The shift amount calculator generates one shift amount under a double-precision mode and two shift amounts under a single-precision mode. The first level shifters can concurrently receive two double-precision mantissas under the double-precision mode or two single-precision mantissas under the single-precision mode. The first level of shifts performs small shifts concurrently on the two double-precision mantissas according to the single shift amount, or on the two single-precision mantissas according to the two shift amounts. The second level shifters performs large shifts on outputs from the first level shifters to generate one double-precision floating-point result or two single-precision floating-point results.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
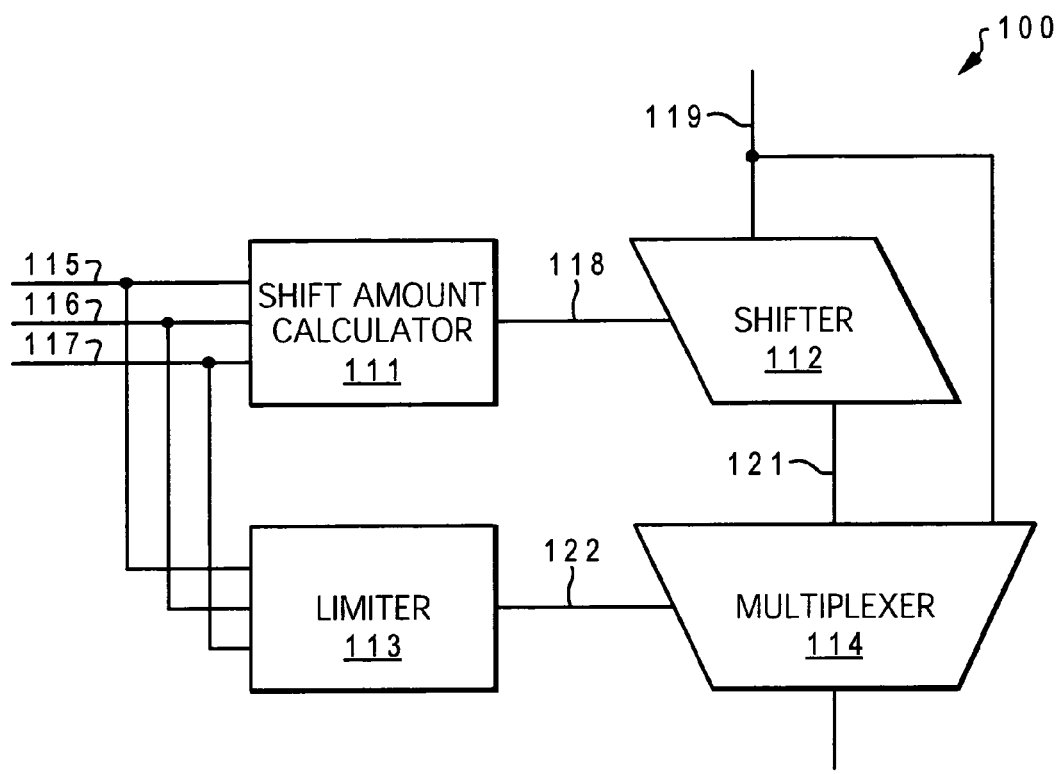
FIG. 1 is a block diagram of an alignment shifter, according to the prior art.

In accordance with a preferred embodiment of the present invention, a multi-mode alignment shifter is utilized to support both single-precision and double-precision operations. The multi-mode alignment shifter includes two modes, namely, a single-precision mode and a double-precision mode. The operations of the multi-mode alignment shifter can be divided into three main steps:

Step 1: Bit Arrangement and Exponent Difference

Since exponents and mantissa are in different fields, they need to be arranged (or multiplexed) differently for single precision and double precision floating-point numbers. In double-precision mode, two copies of a 53-bit mantissa are identical. In single-precision mode, the first of two 24-bit single-precision mantissas is loaded into the left 24 bits of the first 53-bit copy of the mantissa with the remaining 29 bits set to zero, and the second of two 24-bit single-precision mantissas is loaded into the second copy of the 53-bit mantissa shifted right by N positions with the other bits set to zero. The variable N is selected so that the multiplier decimal point of the double-precision result is at the same place as the multiplier decimal point of the single-precision result. For the present embodiment, N is set to 29, as follows:

A double-precision floating-point number having mantissa=53 bits+2 safety bits+106 bit product:
  0 . . . 52 53 54 44 56 . . . 57 58 59 . . . 160

A single-precision floating-point number having mantissa=24 bits+2 safety bits+48 bit product:
  0 . . . 23 24 25 26 27 . . . 28 29 30 . . . 73

The double-precision multiplier decimal point is located after bit position 56, and the single-precision multiplier decimal point is located after bit position 27. Thus, N=56−27=29.

There are two parallel calculations of the exponent difference (Ex,Ey). In double-precision mode, Ex and Ey preform the same calculation in parallel. In single precision mode, Ex and Ey preform different calculations. The Ey calculation belongs to the second set of single-precision exponents. Since the mantissa is shifted N bit positions in the value fed into the shifters, no special modifications are required to the shifter controls. The Ex calculation belongs to the first set of single precision exponents. In the final result the single-precision result for the first operand will be in discontinuous fields. The first half of the field is in positions [0:23], and no modification is required for the shift controls for that field. The second half of the field is in positions [104:151]. Bit 24 moves to bit position 104, so the value of 80 needs to be added to the shift controls for multiplexor in this field in single-precision mode. Since the value 80 is evenly divisible by 16, the timing critical controls to shifters for the small shifts of 0-15 do not need to be adjusted. The adjustment only needs to take place for the less timing critical controls for the larger shifts.

Step 2: Small Shifts in Parallel

Mantissas are shifted using the calculated exponent difference. The least significant bits (LSBs) of the shift amount are available first so the LSB shifts can begin before the most significant bit (MSB) shift amounts are available. The first several shifts are performed in parallel. In the double-precision mode, the two shifts use the same data. In the single-precision mode, some zeroes are padded into the data. There are two parallel single-precision shifts for the small (LSB) shift amounts. The right shift is for distances 0-15.

Step 3: Large Shifts

In double-precision mode, the bits are arranged so that there is only one result. In single-precision mode, the bits are arranged so that there are two results. The data for the shifters that belong to the first single-precision result are fed only from copy 1 of the small shift results. The data for the shifters that belong to the second single-precision result are fed only from copy 2 of the small shift results. The result for the second single-precision operation is in contiguous fields in the middle of the double-precision result. The shift controls for this field require no modification since the adjustment of N positions was made in step 1. The multiplier decimal point for this single-precision field is the same as the multiplier decimal point for the double-precision field. The result for the first single-precision field is split into two non-adjacent fields separated by 80 positions.

The first part of the sp_result_1_field starts in positions 0, and no modification is required for the controls to those shifters. The second part of the sp_result_1_field starts 80 positions after the ending of the first half of the sp_result_1_field, so that in single-precision mode, the value 80 must be added to the controls to those fields. Since 80 is evenly divisible by 16, and the second level multiplexors shift by multiples of 16, all of the entire adjustment only needs to be applied to the controls of the second level multiplexors for the second part of the single-precision_result_1 field. The hardware for performing large shifts is shared, and there is no additional multiplexing required. As in the prior art, after the large shifts, the result still needs to be modified for the right shift overflow and right shift underflow cases.

Figure 2:
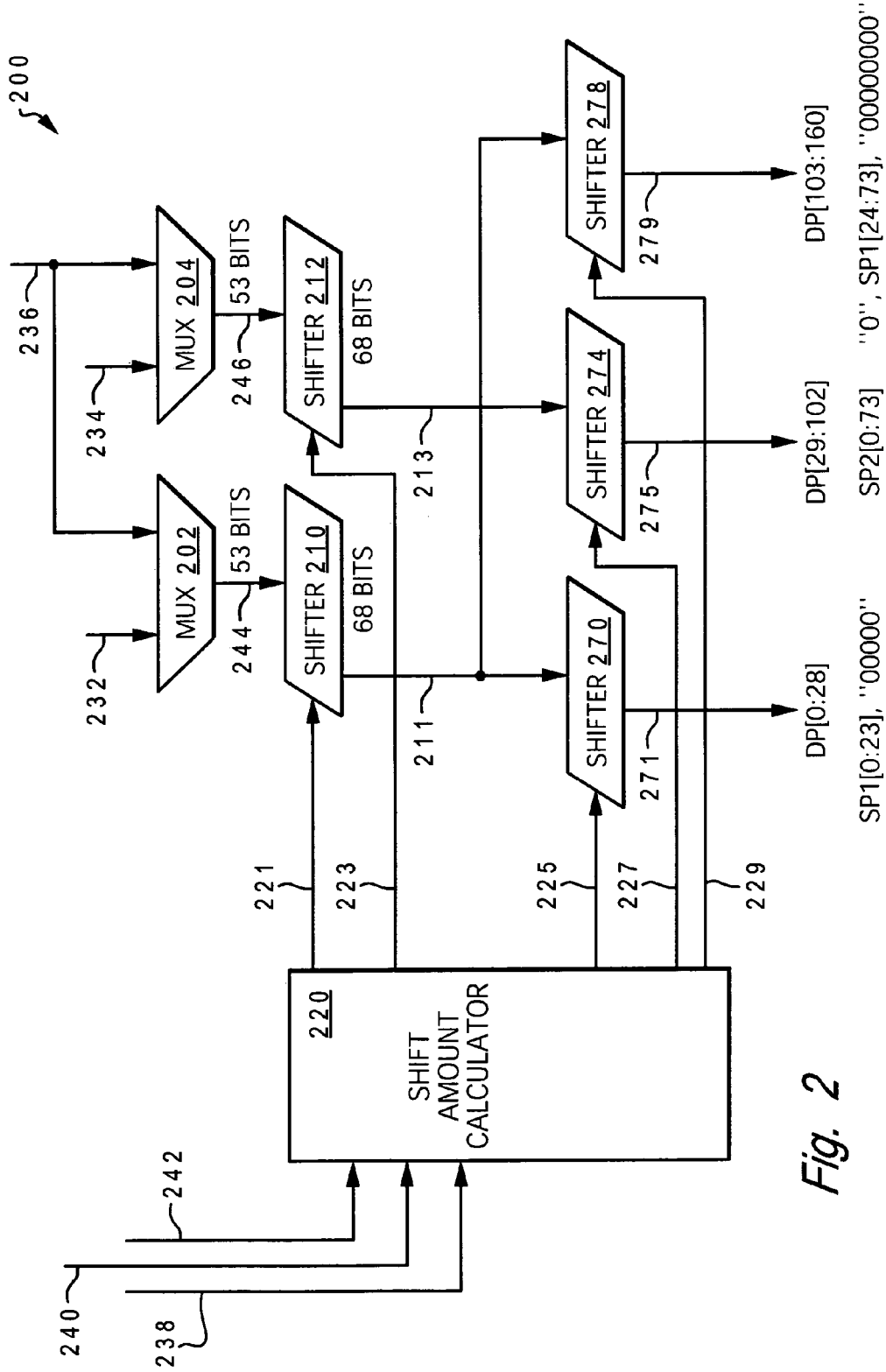
FIG. 2 is a block diagram of an alignment shifter, in accordance with a preferred embodiment of the present invention.

Referring now to the drawings and in particular to FIG. 2, there is depicted a block diagram of a multi-mode alignment shifter, in accordance with a preferred embodiment of the present invention. As shown, a multi-mode alignment shifter 200 includes a shift amount calculator 220, multiplexors 202, 204, shifters 210, 212 and shifters 270, 274, 278. Multi-mode alignment shifter 200 differs from alignment shifter 100 (from FIG. 1) in that multi-mode alignment shifter 200 can preform one double-precision floating point calculation or two single-precision floating point calculations concurrently.

Multi-mode alignment shifter 200 includes two modes, namely, a single-precision mode and a double-precision mode. In double-precision mode, both multiplexors 202 and 204 receive a 53-bit double-precision mantissa via a line 236. In single-precision mode, a first 24-bit single-precision mantissa is placed inside the 53-bit wide output of multiplexor 202 via a line 232, and a second 24-bit single-precision mantissa is placed inside the 53-bit wide output of multiplexor 204 via a line 234, concurrently. For multiplexor 202, the first single-precision mantissa is placed at bit positions [0:23] with [24:52] set to zero. For multiplexor 204, the second single-precision mantissa is placed at positions [29:52] with [0:28] set to zero. This is equivalent to a right shift of N bit positions (N=29 for the present embodiment) for the second single-precision field so that if the shift amount is zero, single-precision mantissa bit 0 will be in output bit position 29, which is the $0^{th}$ position in the output field for the second single-precision mantissa. A mode control input (not shown) is utilized to control multiplexors 202 and 204 for selecting either single-precision floating-point numbers or double-precision floating point numbers. The output of multiplexor 202 is sent to shifter 210 via a line 244, and the output of multiplexor 204 is sent to shifter 212 via a line 246.

The exponents of the product and addend of the first single-precision floating-point number (EA1, EB1, and EC1) are sent to shift amount calculator 220 via a line 238. The exponents of the product and addend of the second single-precision floating-point number (EA2, EB2, and EC2) are sent to shift amount calculator 220 via a line 242. The exponents of the product and addend of the double-precision floating-point number (EA, EB, and EC) are sent to shift amount calculator 220 via a line 240.

After all the proper data have been received, shifting calculations can begin. Based on the mode selected, shift amount calculator 220 produces either a single shift amount under double-precision mode, or two shift amounts under single-precision mode. If double-precision mode is selected, the four LSBs of the right shift amounts (controls for shift distances 0-15) are sent to shifter 210 on a line 221, and to shifter 212 on a line 223. The other MSBs of the right shift amount are sent to shifter 270 on a line 225, to shifter 274 on a line 227, and to shifter 278 on line 229.

If single-precision mode is selected, the four LSBs of the right shift amount from the second shift amount calculation is sent to shifter 212 via line 223, and the other MSBs of the right shift amount are sent to shifter 274 via line 227. Concurrently, the four LSBs of the right shift amount from the first shift amount calculation is sent to shifter 210 via line 221, and the other MSBs of the right shift amount are sent to shifter 270 via line 225. Line 229 is used to send a modified copy of the MSB shift amount to shifter 278. The modification is to add X (80 for the present embodiment) to the shift amount, to account for the discontinuity in the first single-precision field. Since the lower four binary digits of X (80 for the present embodiment) are "0000," no adjustment is necessary for the small shifts (0-15) preformed in the first level of multiplexors. The LSB shift amount is more timing critical than the MSB shift amount, so the overall delay is not increased by a simple manipulation of the larger shift amount bits.

Shifters 210 and 212 preform shifts of distances 0-15 bits; since the inputs are 53 bits wide, the right shifted output is 68 bits wide. In double-precision mode, the input data and shift mounts to shifters 210, and 212 are identical, so the output is also identical. In single-precision mode, the input data and shift amount to shifter 210 belong to the first single-precision number, the input data and shift amount to shifter 212 belong to the second single-precision number, the input data to shifter 210 was not pre-shifted, and the input data to shifter 212 was pre-shifted right 29 positions to correlate to the position of the SP2 output field relative to the double-precision data flow. A shift amount of zero in single-precision mode will put the MSB of the addend at position 29 of the double-precision data flow because the SP2 addend was pre-shifted 29 positions by multiplexor 204. Shifter 210 sends its 68 bit output to shifters 270 and 278 via line 211. Shifter 212 sends its 68 bit output to shifter 274 via a line 213.

The double-precision output positions are somewhat arbitrary in that the number of safety bits can vary. The large shift right (by multiples of 16) is preformed by shifters 270, 274, and 278. In double-precision mode, the right shift amounts to shifters 270, 274, and 278 are identical and the combined effects of shifters 270, 274, and 278 are to act as one large shifter. Shifter 270 correlates to double-precision output bit positions [0:28], shifter 274 correlates to double-precision output bit positions [29:102], and shifter 278 correlates to double-precision output bit positions [103:160].

In single-precision mode, shifter 274 is used to create the second single-precision output result field, and its input data originates from multiplexor 204, which comes from the second single-precision addend. The data was placed into multiplexor 204 right shifted by 29 positions so that a shift amount of 0 will place the addend MSB in position N (29 in the present embodiment) of the double-precision data flow. Position N of the double-precision data flow correlates to position 0 of the SP2 output field. In single-precision mode, shifters 270 and 278 are used to generate the SP1 result field. The field is not continuous relative to the double-precision data flow. Shifter 270 creates SP1 output bit positions [0:23] which correlate exactly to double-precision output bit positions [0:23]. Shifter 278 creates SP1 output bit positions [24:73] that corresponds to double-precision output bit positions [104:151]. Since shifter 270 correlates directly to the double-precision bit positions, the shift amount does not require any adjustment, however, since shifter 278 does not correlate to the double-precision output positions, some adjustments to the shift amount are necessary in double-precision mode. Since there is a gap of X (80 in the present embodiment) between the two parts of the output field, the shift amount needs to be adjusted by X for shifter 278. Shift amount calculator 220 provides the shift amount to shifter 270 on line 225, and provides the shift amount to shifter 278 on line 229. Line 225 is the normal version of the MSBs of the SP1 shift amount calculation. Line 229 differs from 229 in that it adds X (80 in the present embodiment) to the shift amount in single-precision mode. Since X=80 is evenly divisible by 16, it does not effect the timing critical shift amount to shifter 210. The large shift controls are not as timing critical as the small shift controls, so the manipulation of the large shift controls should not increase the delay of alignment shifter 200.

Except for the width of the product, the width of the output fields is somewhat arbitrary depending on factors such as the number of safety bits used, and method for handling shift underflow and shift overflow. The targeted format is of the form [M,S,P], where M is the width of the mantissa (53 for double-precision, 24 for single-precision), S is two safety bits (arbitrary width), P is the width of the product (106 for double-precision, 48 for single-precision). The multiplier decimal point is located between the second and third product bits. The output width is (53+2+106=) 161 bits for double-precision mode, and is (24+2+48=) 74 bits for single-precision mode. It is desirable to align one of the single-precision product decimal points with the double-precision decimal point (between 56 and 57 in the data flow of the present embodiment).

In double-precision mode, the output bit positions are labeled [0:160]. In double-precision mode, shifter 270 produces double-precision output bit positions [0:28], shifter 274 produces double-precision output bit positions [29:102], and shifter 278 produces double-precision output bit positions [103:160]. In single-precision mode, shifter 274 produces SP2 output bit positions [0:73], shifter 270 produces SP1 output bit positions [0:23] followed by five unused bits, shifter 278 produces one unused bit followed by SP1 output bit positions [24:73] followed by nine unused bit positions. The decimal point for the double-precision product and the SP2 product are in the same position. No extra multiplexors are required on the second level of shifters to accommodate the output of two aligned single-precision numbers. The outputs of shifters 270, 274, and 278 are not the final aligned output. The result needs to be limited for the overflow and underflow cases, as it is well-known by those skilled in the art.

As has been described, the present invention provides an improved method and apparatus for performing alignment shifting in a floating-point unit.

While the invention has been particularly shown and described with reference to a preferred embodiment, it will be understood by those skilled in the art that various changes in form and detail may be made therein without departing from the spirit and scope of the invention.

What is claimed is:

1. A multi-mode alignment shifter, comprising:
    a shift amount calculator for generating one shift amount under a double-precision mode and for generating two shift amounts under a single-precision mode;
    a plurality of first level shifters for concurrently receiving two double-precision mantissas under said double-precision mode or two single-precision mantissas under said single-precision mode, wherein said first level of shifts concurrently performs small shifts on said two double-precision mantissas according to said one shift amount, or on said two single-precision mantissas according to said two shift amounts; and
    a plurality of second level shifters for performing large shifts on outputs from said plurality of first level shifters to generate one double-precision floating-point result or two single-precision floating-point results.

2. The alignment shifter of claim 1, wherein said alignment shifter further includes a plurality of multiplexors coupled to said plurality of first level shifters, wherein said plurality of multiplexors selectively allow either two double-precision mantissas or two single-precision mantissas to be loaded into said plurality of first level shifters.

3. The alignment shifter of claim 1, wherein, under said double-precision mode, the four least significant bits of said shift amount are sent to said plurality of first level shifters, and the remaining bits of said shift amount are sent to said plurality of second level shifters.

4. The alignment shifter of claim 1, wherein, under said single-precision mode,
    the four least significant bits of a first one of said two shift amounts are sent to a first one of said plurality of first level shifters, and the remaining bits of said first one of said two shift amounts are sent to a first one of said plurality of second level shifters; and
    the four least significant bits of a second one of said two shift amounts are sent to a second one of said plurality of first level shifters, and the remaining bits of said second one of said two shift amounts are sent to a second one of said plurality of second level shifters.

5. The alignment shifter of claim 1, wherein each of said plurality of second level shifters generates a subset of one double-precision floating-point result under said double-precision mode, or one of said plurality of second level shifters generates a first single-precision floating-point result and each of remaining ones of said plurality of second level shifters generates a subset of a second single-precision floating-point result.

6. The alignment shifter of claim 1, wherein said plurality of first level shifters includes two shifters having a double-precision width.

7. The alignment shifter of claim 6, wherein each of said two shifters receives one 53-bit mantissa under said double-precision mode or two 24-bit mantissa under said single-precision mode.

8. The alignment shifter of claim 7, wherein a first one of said two 24-bit mantissa is placed at bit positions [0:23] of a first one of said plurality of first level shifters, and a second one of said two 24-bit mantissa is placed at bit positions [29:52] of a second one of said plurality of first level shifters.

9. The alignment shifter of claim 8, wherein bit positions [24:52] of said first one of said plurality of first level shifters are set to zero, and bit positions [0:28] of said second one of said plurality of first level shifters are set to zero.

10. The alignment shifter of claim 1, wherein said plurality of second level shifters includes three shifters having a single-precision width.

* * * * *